(12) United States Patent
Brennan et al.

(10) Patent No.: US 9,058,374 B2
(45) Date of Patent: Jun. 16, 2015

(54) CONCEPT DRIVEN AUTOMATIC SECTION IDENTIFICATION

(71) Applicant: International Business Machines Corporation, Armonk, NY (US)

(72) Inventors: Paul E. Brennan, Dublin (IE); Scott R. Carrier, Apex, NC (US); Seamus R. McAteer, Dublin (IE); Daniel J. McCloskey, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/037,506

(22) Filed: Sep. 26, 2013

(65) Prior Publication Data

US 2015/0088888 A1    Mar. 26, 2015

(51) Int. Cl.
*G06K 9/34* (2006.01)
*G06F 17/30* (2006.01)
*G06F 11/14* (2006.01)

(52) U.S. Cl.
CPC ...... *G06F 17/30598* (2013.01); *G06F 11/1435* (2013.01); *G06F 17/30722* (2013.01); *G06F 17/3053* (2013.01)

(58) Field of Classification Search
USPC .................................. 382/175, 176, 229, 305
See application file for complete search history.

(56) References Cited

U.S. PATENT DOCUMENTS

| | | | |
|---|---|---|---|
| 5,073,953 A | 12/1991 | Westdijk | |
| 6,654,744 B2 | 11/2003 | Katayama et al. | |
| 6,970,881 B1 * | 11/2005 | Mohan et al. | 1/1 |
| 7,937,338 B2 | 5/2011 | Boguraev et al. | |
| 8,005,877 B2 | 8/2011 | McDonald | |
| 2003/0084022 A1 | 5/2003 | Nakano | |
| 2006/0089947 A1 * | 4/2006 | Gallivan et al. | 707/102 |
| 2007/0260564 A1 | 11/2007 | Peters et al. | |
| 2008/0059498 A1 | 3/2008 | Carus et al. | |
| 2008/0201130 A1 | 8/2008 | Peters et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0102014 A1 | 4/2012 | Franks et al. | |
| 2012/0330944 A1 | 12/2012 | Vailaya et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |

OTHER PUBLICATIONS

High, Rob, "The Era of Cognitive Systems: An Inside Look at IBM Watson and How it Works", IBM Corporation, Redbooks, 2012, 16 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

*Primary Examiner* — Phuoc Tran
(74) *Attorney, Agent, or Firm* — Stephen J. Walder, Jr.; Jeffrey S. LaBaw

(57) ABSTRACT

Mechanisms are provided for generating section metadata for an electronic document. These mechanisms receive a document and analyze the document to identify concepts present within textual content of the document. The mechanisms correlate concepts within the textual content with one another to identify concept groups based on the application of one or more rules defining related concepts or concept patterns. The mechanisms determine sections of text within the textual content based on the correlation of concepts within the textual content. Based on results of the determining, the mechanisms generate section metadata for the document and store the section metadata in association with the document for use by a document processing system.

20 Claims, 8 Drawing Sheets

410 — Journal of clinical oncology: official journal of the American Society of Clinical Oncology.
460 — Increased intensification and total dose of cyclophosphamide in a doxorubicin-cyclophosphamide regimen for the treatment of primary breast cancer: findings from National Surgical Adjuvant Breast and Bowel Project B-22.

420 — PURPOSE: The National Surgical Adjuvant Breast and Bowel Project (NSABP) initiated a randomized trial (B-22) to determine if intensifying but maintaining the total dose of
470 — cyclophosphamide (Cytoxan, Bristol-Myers Squibb Oncology, Princeton, NJ) in a doxorubicin (Adriamycin, Pharmacia, Kalamazoo, MI)-cyclophosphamide combination (AC), or if intensifying and increasing the total dose of cyclophosphamide improves the outcome of women with primary breast cancer and positive axillary nodes.

430 — PATIENTS AND METHODS: Patients (N = 2,305) were randomized to receive either four courses of standard AC therapy (group 1); intensified therapy in which the same total
480 — dose of cyclophosphamide was administered in two courses (group 2); or intensified and increased therapy, in which the total dose of cyclophosphamide was doubled (group 3). The dose and intensity of doxorubicin were similar in all groups. Disease-free survival (DFS) and overall survival were determined using life-table estimates.

440 — RESULTS: There was no significant difference in DFS (P = .30) or overall survival (P = .95) among the groups through 5 years. At 5 years, the DFS of women in group 1 was similar to that of women in group 2 (62% v 60%, respectively; P = .43) and to that of women in group 3 (62% v 64%, respectively; P = .59). The 5-year survival of women in group 1 was similar to that of women in group 2 (78% v 77%, respectively; P = .86) and to that of women in
490 — group 3 (78% v 77%, respectively; P = .82).

Grade 4 toxicity increased in groups 2 and 3. Failure to note a difference in outcome among the groups was unrelated to either differences in amount and intensity of cyclophosphamide or to dose delays and intervals between courses of therapy.

450 — CONCLUSION: Intensifying or intensifying and increasing the total dose of cyclophosphamide failed to significantly improve either DFS or overall survival in any group. it was concluded that,
495 — outside of a clinical trial, dose-intensification of cyclophosphamide in an AC combination represents inappropriate therapy for women with primary breast cancer.

FIG. 4

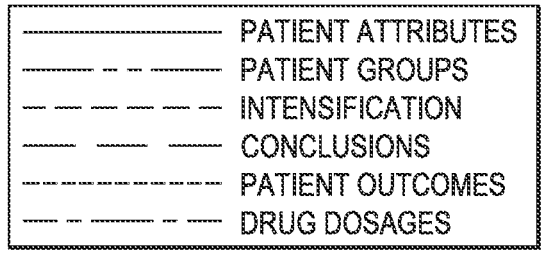

There was no significant difference in DFS (P = .30) or overall survival (P = .95) among the groups through 5 years. At 5 years, the DFS of women in group 1 was similar to that of women in group 2 (62% v 60%, respectively; P = .43) and to that of women in group 3 (62% v 64%, respectively; P = .59). The 5-year survival of women in group 1 was similar to that of women in group 2 (78% v 77%, respectively; P = .86) and to that of women in group 3 (78% v 77%, respectively; P = .82).

Grade 4 toxicity increased in groups 2 and 3. Failure to note a difference in outcome among the groups was unrelated to either differences in amount and intensity of cyclophosphamide or to dose delays and intervals between courses of therapy.

Intensifying or intensifying and increasing the total dose of cyclophosphamide failed to significantly improve either DFS or overall survival in any group. It was concluded that, outside of a clinical trial, dose-intensification of cyclophosphamide in an AC combination represents inappropriate therapy for women with primary breast cancer.

FIG. 5

```
————————— PATIENT ATTRIBUTES
——— — ——— PATIENT GROUPS
—— — — — — INTENSIFICATION
——  ——  —— CONCLUSIONS
—————————— PATIENT OUTCOMES
—— — ——— — DRUG DOSAGES
```

Official journal of the American Society of Clinical Oncology.
Increased intensification and total dose of cyclophosphamide in a doxorubicin-cyclophosphamide regimen for the treatment of primary breast cancer: findings from National Surgical Adjuvant Breast and Bowel Project B-22.
The National Surgical Adjuvant Breast and Bowel Project (NSABP) initiated a randomized trial (B-22) to determine if intensifying but maintaining the total dose of cyclophosphamide (Cytoxan, Bristol-Myers Squibb Oncology, Princeton, NJ) in a doxorubicin (Adriamycin, Pharmacia, Kalamazoo, MI)-cyclophosphamide combination (AC), or if intensifying and increasing the total dose of cyclophosphamide improves the outcome of women with primary breast cancer and positive axillary nodes. Patients (N = 2,305) were randomized to receive either four courses of standard AC therapy (group 1); intensified therapy, in which the same total dose of cyclophosphamide was administered in two courses (group 2); or intensified and increased therapy, in which the total dose of cyclophosphamide was doubled (group 3). The dose and intensity of doxorubicin were similar in all groups. Disease-free survival (DFS) and overall survival were determined using life-table estimates. There was no significant difference in DFS (P = .30) or overall survival (P = .95) among the groups through 5 years. At 5 years, the DFS of women in group 1 was similar to that of women in group 2 (62% v 60%, respectively; P = .43) and to that of women in group 3 (62% v 64%, respectively; P = .59). The 5-year survival of women in group 1 was similar to that of women in group 2 (78% v 77%, respectively; P = .86) and to that of women in group 3 (78% v 77%, respectively; P = .82). Grade 4 toxicity increased in groups 2 and 3. Failure to note a difference in outcome among the groups was unrelated to either differences in amount and intensity of cyclophosphamide or to dose delays and intervals between courses of therapy. Intensifying or intensifying and increasing the total dose of cyclophosphamide failed to significantly improve either DFS or overall survival in any group. It was concluded that, outside of a clinical trial, dose-intensification of cyclophosphamide in an AC combination represents inappropriate therapy for women with primary breast cancer.

FIG. 6

CONCEPT DRIVEN AUTOMATIC SECTION IDENTIFICATION

BACKGROUND

The present application relates generally to an improved data processing apparatus and method and more specifically to mechanisms for concept driven automatic section identification.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

The quality of the results generated by a QA system, or other electronic document processing system, often depends on the ability to extract information from the documents. In order to assist such electronic processing, metadata is often associated with the electronic documents that may be parsed and processed by these electronic document processing systems. However, as with the content of the electronic documents themselves, the quality of the results generated by the electronic document processing system is also limited by the amount and quality of the information provided in this metadata.

SUMMARY

In one illustrative embodiment, a method, in a data processing system comprising a processor and a memory, for generating section metadata for an electronic document is provided. The method comprises receiving, by the data processing system, an electronic document for processing and analyzing, by the data processing system, the electronic document to identify concepts present within textual content of the electronic document. The method further comprises correlating, by the data processing system, concepts within the textual content with one another to identify concept groups within the textual content based on the application of one or more rules defining related concepts or concept patterns. In addition, the method comprises determining, by the data processing system, at least one section of text within the textual content based on the correlation of concepts within the textual content. Moreover, the method comprises generating, by the data processing system, based on results of the determining, section metadata for the electronic document to thereby identify the at least one section in the electronic document. The method also comprises storing, by the data processing system, the section metadata in association with the electronic document for use by a document processing system.

In other illustrative embodiments, a computer program product comprising a computer useable or readable medium having a computer readable program is provided. The computer readable program, when executed on a data processing system or computing device, causes the data processing system or computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram illustrating a manner by which a portion of text may be separated into sections based on structural annotations;

FIG. 5 is an example diagram illustrating the use of conceptual annotations to identify sections of a document in accordance with one illustrative embodiment;

FIG. 6 is an example diagram illustrating the resulting sections of text identified using the mechanisms of one illustrative embodiment;

DETAILED DESCRIPTION

Figure 1:
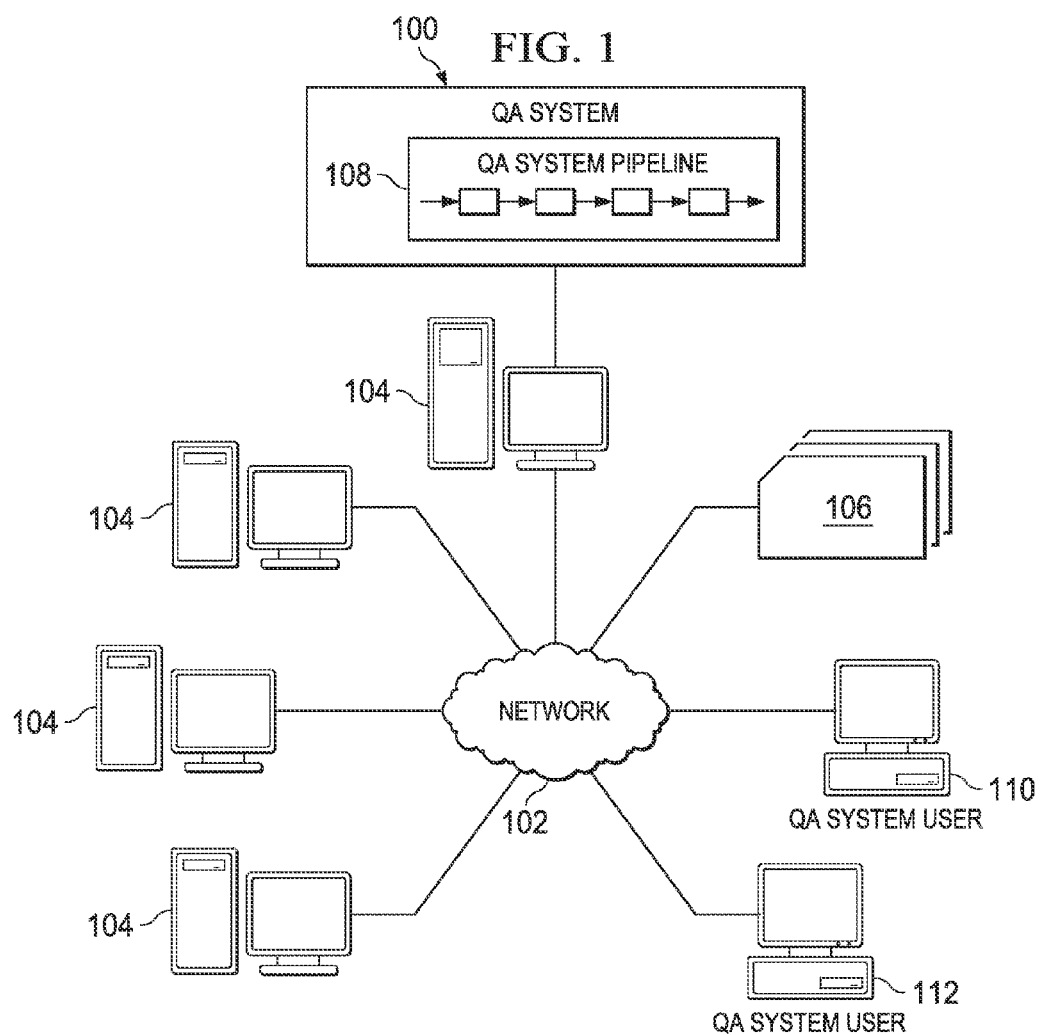
FIG. 1 depicts a schematic diagram of one illustrative embodiment of a question and answer (QA) system in a computer network.

The identification of sections in text is an important consideration in modern unstructured information processing. Tasks such as information retrieval and extraction, text recommendation, and question answering, can all benefit greatly from a deeper awareness of the semantic classification of sub-document text passages. Such semantic classification can be greatly enhanced by utilizing information obtained from identifying distinct portions of semantic content which have an affinity with one another. The identification of such affinities may include providing mechanisms for providing highly accurate identification of contiguous portions of meaningfully related text, especially natural language text. In one illustrative embodiment, the identification of such affinities may include correlating section text with section headings and/or predefined semantic categories/subject matter. In some illustrative embodiments, the affinities may be determined between individual concepts for clustering of related entities. Moreover, the affinities may be determined between sets of clusters of concepts to assist in distinguishing unrelated passages of text.

It should be appreciated that the term "concept" as it is used in this description refers to a pre-defined semantic category, which may appear more or less often in text describing a specific topic. A semantic concept may be, for example, anything from a patient or drug in a medical context, to car parts and damage descriptions in an insurance claim document, or the like. Any potential semantic definition of a category or topic is considered to be within the scope of the term "concept."

The illustrative embodiments provide mechanisms that leverage statistical analysis of these concepts in conjunction with a predefined knowledge base, thereby leveraging what is referred to herein as "concept density" and "concept affinity" in order to accurately partition a document into distinct sections, or related portions. The term "concept density" refers to the frequency of occurrence of a concept type within a portion of textual content. The term "concept affinity" refers to the extent to which a certain concept type, and a potential section or contiguous portion of text, are closely related.

The illustrative embodiments may be used to optimize the operation of any system that is involved in information extraction, and associating tasks of named entity recognition and knowledge extraction, from textual content, especially natural language textual content. Such systems may include text search systems and question answering systems as well as any other types of systems that perform operations on textual content and whose operation may be improved by the partitioning of textual content into groups of conceptually related content, i.e. concept groups.

For purposes of the following description, it will be assumed that the system is a question and answer (QA) system, such as the Watson™ QA system available from International Business Machines Corporation of Armonk, N.Y., however it should be appreciated that the illustrative embodiments are not limited to such and any system operating on textual content may be used with the mechanisms of the illustrative embodiments without departing from the spirit and scope of the illustrative embodiments. In addition, it should be noted that while the following description will focus primarily on the association of contiguous portions of text with each other and with section headers, the illustrative embodiments are not limited to such and may in fact identify related portions of text regardless of the existence or non-existence of section headers. For example, when there are no obvious section headings in the textual content, a change of subject/topic can still be detected with the illustrative embodiments due to the difference in affinity of concept groups, as described hereafter. For example, a portion of text describing drugs and various types of cancer would contain particular semantic concepts, whereas a text about zoological gardens would contain references to animals, and natural habitats, etc. which are different semantic concepts from the portion of text describing drugs and cancer types. Changes in such concept groupings are identified by the mechanisms of the illustrative embodiments and used to identify related portions of text whether or not these portions of text have associated section headers. In some cases, section headers may be inferred based on concepts identified in the portions of text.

By grouping related concepts together into concept groups, the mechanisms of the illustrative embodiments can distinguish between portions of text associated with these concept groups even within the same contiguous portion of text in order to split the portions of text into separate sections without any structural clues. These groupings or clusters of concepts within the textual content may be recognized using an existing knowledge base and labels may be assigned to the various resulting sections of text in the output metadata for the portion of content, e.g., a document or the like. In addition, as a result of groupings or clusters of concepts being identified within the portion of content, this also identifies those pieces of the portion of content that are not part of the groupings/clusters and thus, not related, which can likewise be helpful in assisting with textual content processing, such as by a text search system, QA system, or other information extraction system.

In one illustrative embodiment, the mechanisms of the illustrative embodiment may be used to boost relevancy scores for an answer text in a question and answer (QA) system based on the identification of a section in which the relevant features occur. For example, in a QA system operating on patient-specific data, the mention of a medical condition X in a "History of Present Illness" section of a patient's medical record should score more highly than a mention of the medical condition in a section of the patent's record or another medical document primarily concerned with describing medical procedures.

One way to identify a section of text in content, e.g., documents or other portions of text, is to identify a section heading in the content being processed and associating text in the content with the identified section heading. The identification of a section heading may be done in many ways including identifying the section heading as a sentence containing a single word, or a small number of words less than a predetermined threshold number of words, followed by a line break. A colon character, or other special character, appended to this sentence is taken as additional evidence to indicate that the word or phrase is a section heading. The paragraph(s) of text immediately following the identified section heading are then understood to be the related body of text. Other more sophisticated attempts to identify section headers and corresponding text may use statistical methods or pattern rules based on known section heading keywords and formatting characters.

A major challenge exists, however, in determining the boundary of the text associated with the particular section heading, i.e. the related section text. One approach is to identify the related section text as the text appearing immediately after a section header and continuing until the end of the paragraph is encountered or until a next section header is encountered in the text of the content. Such approaches often misrepresent the subject matter of the section content, as there may be several sets of subject specific content within a single paragraph or portion of text appearing between section headers. Moreover, in approaches where related text is assumed to be immediately subsequent to the section header and continues until a new section header is encountered, a difficulty may arise when there is no other section headers in the document. Thus, subsequent paragraphs or portions of text may not have an explicit semantic link to the most recent section header. Moreover, in some cases a section can end with a single line, a character, or the like, that makes that portion of text appear to be another section header when it is not intended to be one.

The illustrative embodiments described herein provide a solution to the above issues that operates to link text following a particular section header (or section heading) only if there is a semantic link to that section header. For example, in the medical domain, the Logic Observation Identifiers Names and Codes (LOINC) are used to identify particular sections in a patient's medical history record document. These can be critical to ensuring accurate automated analysis of the patient's case or in determining appropriate treatment. Determining the most appropriate LOINC code to be applied to a section can be difficult when there are no obvious indications of section delimiters from the structure or format of the document. In such cases, the content of the text itself must be analyzed for named entities related to particular section types. There are many ways in which these named entities can be considered to indicate a particular section or LOINC code. An example of this is the order in which these named entities, or ordered clusters of such entities, appear in the text.

The illustrative embodiments utilize concept affinities based on semantic interaction of concepts with each other. Such concept affinities may be affinities between identified concepts in textual content and proposed section headings or semantic categories/subject matter, affinities between individual concepts for clustering of related entities, affinities between sets of clusters of concepts to thereby distinguish related and unrelated portions of text, and the like. In some cases, the concept affinities are identified within the context of the structural elements of the portion of content, where the portion of content may be in the form of documents, portions of text, web pages, scanned-in documents, or the like (referred to hereafter collectively as simply "documents").

The illustrative embodiments exploit the notion that document sections (including headings) tend to contain discussions on topics which are described by a set of interacting and strongly related concepts. For example, a "Medications" section will almost certainly contain mentions of concepts of type "Drug" and, given a mention of a type of "Drug" in a section following a heading "Medications," it is very likely that concepts of the type "Dosage," "Route," "Frequency," and "AdverseDrugReaction" will also be mentioned in the sentences which make up that section. Linked groups of concepts or topics often are indicative of a section in a document whether or not a section heading is present. The illustrative embodiments exploit such features to score portions of a document in order to determine section boundaries and associate these sections with corresponding section headings, if such section headings are present, or with proposed section headings in some illustrative embodiments.

With the mechanisms of the illustrative embodiments, when processing a document, all potential sections of a document are identified based on topic/concept groupings and a scoring methodology. The identification of potential sections and the scoring methodology may be applied for determining affinity of sections to each other and to existing or proposed (inferred) section headings (generated based on the result of semantic content concept grouping or clustering) at each granularity level, e.g., word, sentence, paragraph, or the like. The affinity of each section to an actual or inferred section heading and to each other is calculated. Overlapping sections are possible and the final section assignment and selection is based on choosing the highest scoring section heading/section text and section text/section text pairs which cover the document in a non-overlapping manner.

Thus, the mechanisms of the illustrative embodiments do not depend upon structure delimiters, such as paragraph breaks, special characters, or the like, to link sections of text with each other or sections of text with corresponding section headers, actual or inferred. To the contrary, the mechanisms of the illustrative embodiments analyze the content text to identify concepts within the section text and any actual or inferred section headers based on ontologies, semantic networks, and other knowledge bases, and then correlate the section texts with each other and with the section headings, inferred or otherwise, so as to generate metadata, e.g., annotations, that link sections of text with each other and/or corresponding actual or inferred section headings, general semantic categories, or the like. The correlations are based on relatedness of concept groups or clusters, which gives a strong indicator of semantic affinity. The scoring mechanisms of the illustrative embodiments provide a manner by which such affinities may be quantified and used as a basis for selecting section assignments for annotating documents for use with analytical mechanisms, such as natural language processing (NLP) systems, Question and Answer (QA) systems, or the like.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional logical declarative/procedural programming languages, such as the "C" programming language, Prolog, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. The mechanisms of the illustrative embodiments are especially well suited for assisting with the processing of portions of content comprising text, such as documents, web pages, portions of documents, passages, or the like. As such, the mechanisms of the illustrative embodiments may assist in the processing of documents by Natural Language Processing (NLP) systems, Question and Answer (QA) systems, or any other system that processes textual content based on the correlation of sections of text with section headings. For purposes of the following description, and only as a non-limiting example, the illustrative embodiments will be described with relation to a Question and Answer (QA) system utilizing annotated documents in a corpus of information to generate candidate answers for an input question. It should be appreciated that this is only an example and is not intended to state or imply any limitation as to the types of textual content processing systems with which the mechanisms of the illustrative embodiments may be utilized or integrated. Other types of textual content processing systems that perform operations for information extraction, entity recognition, or the like, may be used with the mechanisms of the illustrative embodiments without departing from the spirit and scope of the illustrative embodiments.

Figure 2:
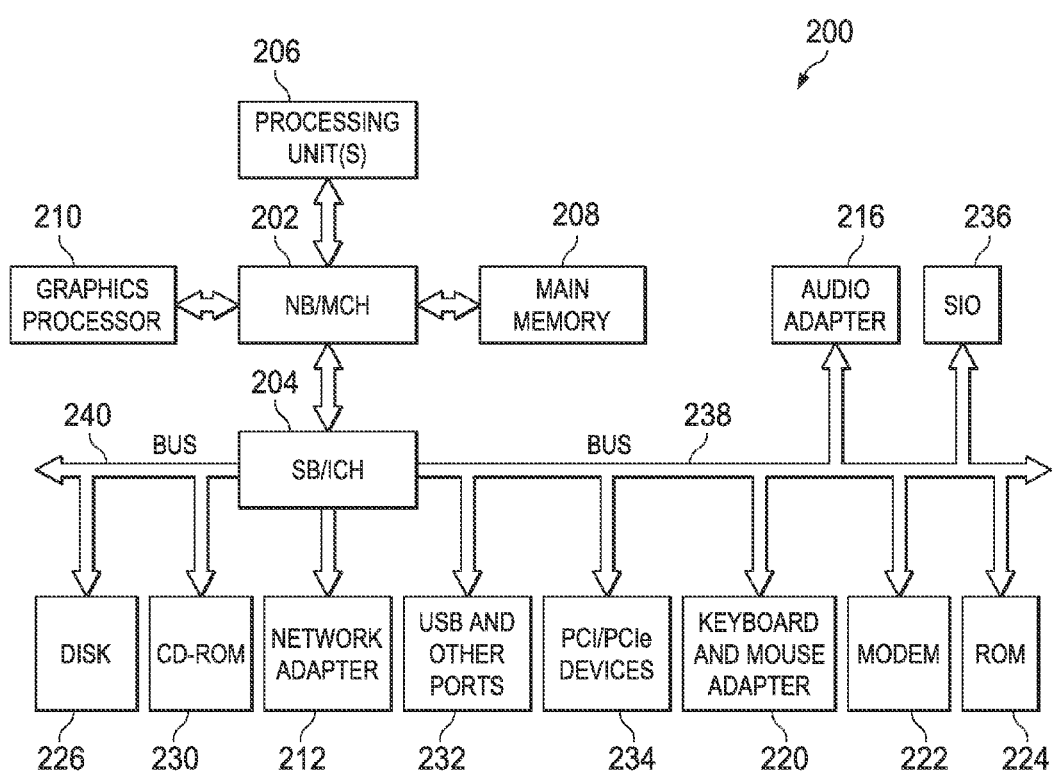
FIG. 2 depicts a schematic diagram of one embodiment of the QA system of FIG. 1.
Figure 3:
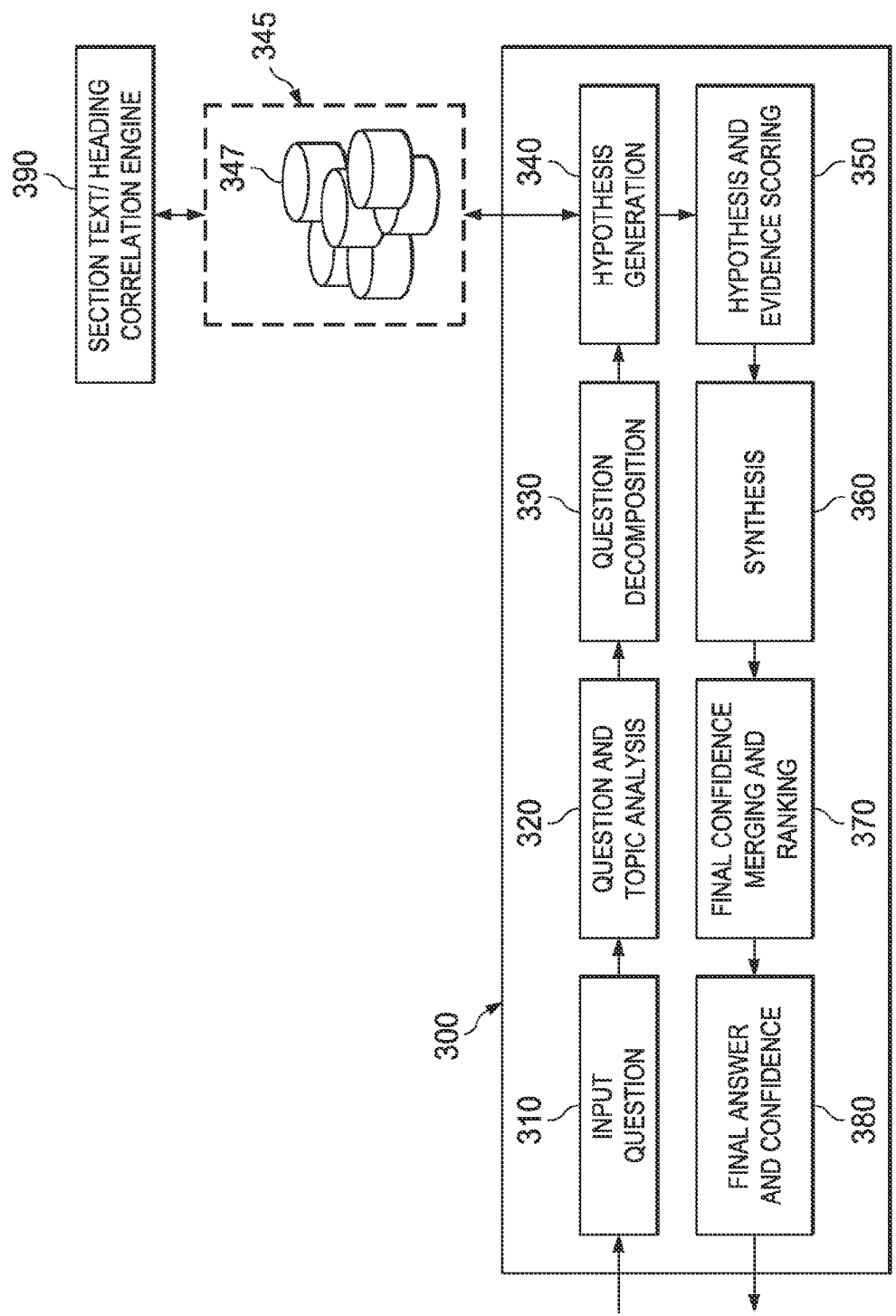
FIG. 3 is an example block diagram of a question and answer system analysis pipeline in accordance with one illustrative embodiment.

In view of the above, FIGS. 1-3 are directed to describing an example Question/Answer, Question and Answer, or Question Answering, (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to annotating documents, or portions of documents, for purposes of assisting the QA system in the processing of these documents, or portions of documents. Specifically, the mechanisms of the illustrative embodiments generate annotations to correlate sections of text with section headings which can then be used by the QA system to identify candidate answers to input questions.

Since the examples provided herein for illustrating the mechanisms of the illustrative embodiments are directed to a QA system implementation, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question and answer creation (QA) system 100 in a computer network 102. One example of a question and answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106.

In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. It should be appreciated that while an object-oriented programming system is used as an example herein, the data processing system 200 may employ any programming language, including declarative, object-oriented, procedural, or any other type of programming language suitable for the particular implementation. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, collections of sources, and the like, may represent different corpus 347 within the corpora 345. There may be different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpora or corpus of data/information, e.g., the corpora/corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, and described above, the hypothesis generation stage 340 involves the application of one or more queries to the corpus of data (or information) which may comprise textual documents or portions of documents and associated metadata. In accordance with the mechanisms of the illustrative embodiments, this metadata may include annotations for the documents including structural and conceptual annotations. The annotations assist the hypothesis generation stage 340 in generating candidate answers to the input question by providing additional information that may be used to identify the association of sections of text in the documents, or portions of documents, with section headings. The associations of sections of text with section headings may be codified in metadata associated with the documents and such associations may likewise be used by the hypothesis generation stage 340 in generating candidate answers, e.g., by modifying scores for passages within a document or for the document as a whole based on the sections in which candidate answers are found.

That is, in accordance with the illustrative embodiments, a section text/heading correlation mechanism 390 is provided for creating structural and conceptual annotations for use in analyzing portions of textual content, e.g., documents, portions of documents, web pages, etc., applying patterns of structural and conceptual annotations to portions of content to identify whether such patterns are present, scoring the portions of content based on the application of patterns so as to draw correlations between section text and between section text and section headings, and using external context as input for performing section disambiguation and boosting. Each of these operations performed by the section text/heading correlation mechanism 390 will be described in greater detail hereafter.

The portion of content, referred to herein as a document for simplicity, that is to be sectioned, is annotated with both structural and conceptual annotations. While this example illustrates the document having structural annotations, it should again be appreciated that the illustrative embodiments do not require such structure annotations and may operate entirely based on the identification of concepts within the content of the document itself using previously defined knowledge resources. In cases where structural annotations are provided, these structural annotations may be used in addition to the concept identification and annotations to identify sections of text, affinities between portions of text, affinities of text with concepts, and affinities of sections of text with actual or inferred section headings.

In the depicted example, the structural annotation types may include such things as paragraph breaks, text followed by a colon, or other types of annotations that denote the structure, format, or other identifications of form of the portion of the content. These structural annotations are identified by the section text/heading correlation mechanism 390 in the portion of content through the application of structure or formatting rules, either explicitly coded by a programmer or learned from a sample corpus of information using standard machine learning techniques. Such structural annotations are generally known in the art and may be automatically or manually entered into a document or the document's metadata, e.g., word processors and the like often insert structure annotations into the coding of document when the user uses certain keystrokes in the creation of the document, or mark-up languages or tools for generating web pages often insert tags and other structural metadata for denoting structural aspects of a document. Thus, the structural annotations may already exist within a document, or as part of metadata associated with the document, and may not necessarily be inserted or added by the section text/heading correlation mechanism 390 itself, although this is also possible in some illustrative embodiments.

Conceptual annotations, e.g., named entities, semantic and lexical relationships, and the like, on the other hand, are based on one or more input ontologies, i.e. formal representations of knowledge as a set of concepts within a domain, and the relationships between pairs of concepts, to thereby model a domain. These ontologies may comprise key domain dependent or independent ontologies, such as the Foundational Model of Anatomy (FMA) (an ontology describing domain-vocabulary of the medical domain and specifically all parts and functional systems of the human body), WordNet, or the like, derived semantic networks (networks of linked related terms, facts, and concepts), and/or manual or computed extensions to these ontologies and semantic networks based on a representative corpus of documents.

For example, derived semantic networks may comprise associating a particular portion of text with a particular concept in an ontology, e.g., by recognizing that "Felix" is an instance of the concept "cat", one may also infer that Felix has 4 legs, a tail, and likes to chase mice, even though the text itself may not mention these facts. Performing such associations for an entire body of text in a document, or corpus of documents, may result in a semantic network that is built up using the underlying ontologies as structural links between the instances in the text.

In another example, the derived semantic networks may comprise the learning of new facts which are not already stored in an existing knowledge resource, by parsing the natural language text. For example, in the text "Felix the cat was in a fight and has only three legs, one can infer several new facts including (1) cats can be in fights, and (2) cats can have three legs and not just four legs. This information may be stored as part of a derived semantic network. Other types of semantic networks may be built up from the parsing of text and the determination of relationships between terms, facts, concepts, and the like.

Thus, in processing a corpus of documents, patterns of terms may be identified that indicate a relationship between these terms and this information may be used to augment already established ontologies and semantic networks (e.g., the terms "headache" and "pain in the head" are often used interchangeably or together in documents in the corpus and thus, may be linked in a semantic network).

For example, within the "Medical" domain, an ontology for the Medical domain may link concepts such as "Disease", "Drug", and "Treatment," etc. together as related concepts. In a semantic network for the Medical domain, one may link the terms "headache," "pain in the head," and "cephalgia" together such that they all map to the same concept and are therefore treated as semantically equivalent, i.e. synonyms. Similarly, hormone instances, such as "T3" and "T4" may both be recognized as thyroid hormones in the ontology/semantic network for the Medical domain, although they are not identical entities but are recognized as closely related based on their linkage in the ontology. It should be appreciated that while the example of synonyms will be used throughout this description as an example of the linkage between terms that is recognizable by the use of semantic networks and ontologies, the illustrative embodiments are not limited to such and any semantic relationships may be represented by semantic networks and ontologies.

Thus, the ontologies, semantic networks, and other knowledge bases for specific or generic domains may be used to annotate documents with concept annotations. For example, the semantic network for a domain may be used to recognize terms in a document and relate those terms to a concept which may then be used with a domain specific ontology to identify a corresponding set of related concepts and thereby identify other portions of the document corresponding to these related concepts.

As one example, a document may include, in one portion of the document, the term "headache" and in another portion, the term "acetaminophen." The semantic network and ontology may recognize the term "headache" to be a "symptom" or "illness" or other similar concept, and the term "acetaminophen" to be a "drug." Moreover, the document may also include in another portion of the document the term "pain in the head" which the semantic network may identify as semantically related to the term "headache," e.g., a synonym to "headache." Thus, in this way, the portions of the document may be conceptually related to one another as being directed to similar concepts (headache and pain in the head) as well as ontologically related concepts (headache/pain in the head with the drug acetaminophen). In this way a pattern of concepts within the document may be identified and thereby a section of related text having related concepts may be identified. Moreover, combining this with structural annotations, patterns of structure and conceptual annotations may be used to identify sections of related text and their associated concept groupings/clusters as well as actual and/or inferred section headings and patterns of structure.

That is, in accordance with the illustrative embodiments, structural and/or conceptual annotations may be used as a basis for defining multi-dimensional patterns for identifying candidate sections and/or candidate actual or inferred section headings within a document. In one illustrative embodiment, these patterns comprise structural annotations identifying formatting or other structural elements (e.g., section breaks, single lines, special characters, etc.) expected in a section heading as well as relationships between concept annotations within a section heading. These section heading patterns may be explicitly specified by a user from user known domain section definitions, learned from a sample corpus using machine learning techniques, or may be defined using a combination of user specified and automatic learning techniques. Examples of such section heading patterns include:
<Single Line><section break whitespace>(<section or field candidate><colon—or other section end punctuation>)
<Single Line><SingleEntity>(e.g., <PersonName><whitespace>)+<section break whitespace>
<Single Line><section break whitespace><section or field candidate><colon><paragraph containing at least one of <ConceptA>, <ConceptB>, <ConceptC>><Single Line><colon>?<paragraph containing ConceptE><paragraph containing ConceptF><section break whitespace>

The patterns may be applied to the text in the document to identify portions of the text that are likely to be actual section headings. Natural Language Processing (NLP) techniques may further be used along with these patterns to determine if portions of text match the specified pattern, e.g., NLP may be used to recognize a person's name and then correlate that term being a person's name with the pattern specifying a "<PersonName>" as part of the pattern.

If a portion of text is identified as matching the pattern specified, then the portion of text may be identified as a candidate section heading and appropriate pointers or identifiers of the portion of text, or a copy of the portion of text, may be stored in a candidate section heading data structure for further processing as described hereafter. This candidate section heading data structure may comprise entries for a plurality of portions of text within the document that may be considered candidate section headings.

Similar patterns comprising relationships between concept annotations, in the form of frames (artificial intelligence context used to encode logic or knowledge, e.g., syntactic frames in which logical facts in the form of natural language triplets are extracted from the text and stored in a suitable knowledge base), attribute, value-pair triplets, i.e. (attribute, value-pair), and structural annotations, or the like, may be defined for identifying portions of text in a document that are sections of text corresponding to each other and/or to similar actual or inferred section headings. A plurality of patterns may be defined and applied to the text of the document to identify which patterns are matched by the content of the text of the document. For example, a pattern, or rule specifying a pattern, may be of the type:
<Single Line><colon>?<paragraph containing ConceptE><paragraph containing ConceptF><section break whitespace>.
The patterns may specify structural formats as well as related concepts and an expected ordering of such related concepts within the textual content of the portions of the document. For example, if it is known that ConceptF typically appears after ConceptE in documents of the corpus, then a rule specifying a pattern as set forth in the example above will very reliably identify portions of documents having related concepts E and F in them.

The matching rules/patterns may be scored based on a degree of matching scoring methodology. Scoring a match can be done using any number of Natural Language Processing (NLP) or mathematical techniques for comparing expected with actual results. In the context of an ontology, there are several algorithms for "semantic similarity" that could be leveraged to return a set of concept match scores. Some examples of methods employed could include direct text matching, comparison of associated n-grams of concepts in the text with manually specified patterns, and the like.

The scoring may be done with regard to each of the patterns/rules established for a domain of interest. Thus, for example, if the domain of the corpus being processed is a Medical domain, or more specific domain, such as an Oncology domain, or the like, then a corresponding set of rules/patterns may be retrieved from a rules/pattern storage by the section text/heading correlation mechanism 390 for the domain of the corpus. These rules/patterns may then be applied to a document in the corpus to identify candidate section headings and portions of text corresponding to certain concepts and portions of text corresponding to related concepts and having structural patterns representative of section headings and/or portions of text corresponding to sections associated with a section heading. Thus, proposed section text in the form of sentences and paragraphs are identified along with candidate actual or inferred section headings.

The proposed section text is then related to its potential corresponding section headings through conceptual affinities defined in ontologies and other structured knowledge resources. For example, an ontology may identify a grouping of concepts including "Disease" and "Treatment" with a section text rule/pattern specifying that typically a concept of "Disease" is followed by a concept of "Treatment" within a single section of text. In applying this rule/pattern to a document, and further applying semantic networks, or other knowledge bases, and NLP techniques, a portion of text may be identified in which the terms "heart disease" and "stent" are present with the term "heart disease" being identified as tied to the concept of "Disease" via the semantic network and "stent" being tied to the concept of "Treatment" via the semantic network. If these terms appear in the pattern specified by the rule/pattern, then the portions of text surrounding these terms may be selected for inclusion in the same section of text. Correlating these concepts with identified actual or inferred section headings may then link a section heading to the section text. Thus, for example, if a section heading was found by applying section heading rules/patterns that is of the type "Heart Disease:" or "Diagnosis:", or the like, and the section heading rules/patterns include the concepts of "Disease" or "Treatment" or both, then a correlation may be made between the section text and the section heading. The degree to which the concepts in the section text match the concepts in the section heading or the section heading rules/patterns may be calculated and used to generate quantifiable score for the relationship.

It should be appreciated that the rules/patterns may be established separately for headings, for concept patterns within text, or more generically such that the same rules/patterns may be applied to both headings and concept patterns within text. In some illustrative embodiments, the rules/patterns for section heading identification may differ significantly from the rules/patterns for identifying related concepts within the textual content itself. For example, while the rules/patterns for identifying section headings in the document may take a form as previously described above, a rule/pattern for identifying related concepts within the textual content itself may be of the type: a sentence containing <Drug><Cancer><Patient> and <Mortality> concepts, in a specified order, indicating that the section is about the effect of the specified drug on the patent mortality and thereby relating to a "Patient Mortality" section.

Proposed sections may overlap and a single actual or inferred section heading may have several proposed sections which similarly overlap. Thus, the same portions of text in the document may be present in multiple proposed sections of text with these proposed sections of text overlapping one another. As an example, a portion of text B may be in a proposed section of text comprising text A, text B, and text C. Similarly, the same portion of text B may also be in a proposed section of text comprising text A and text B, or a proposed section of text comprising text A, text B, text C, and text D, such that multiple overlapping proposed sections of text, matching the same or different section text rules/patterns, may be generated and considered when correlating such proposed sections of text with identified section headings.

As an example consider the following text (with numbers in parenthesis indicating sentence numbers and not actually being part of the text itself):

(1) John has been diagnosed with diabetes, type II. (2) He must therefore carefully monitor his intake of sugar. (3) John's medical history and high cholesterol demonstrates that his lifestyle habits have contributed to the onset of the disease. (4) His family history indicates that he will suffer from severe weight problems unless a strict diet and exercise plan are followed. (5) His 60 year old father has also been diagnosed with diabetes, and is clinically obese with failing health. (6) John has severe allergies to wheat and dairy, which will limit his options in terms of diet.

If a set of possible headings includes topics like "Allergies", "Family History", and "Patient Details", various sets of adjacent sentences could be considered as valid sections of related text in the example above. Every atomic component of a section, be it a sentence or a paragraph, for example, is considered on its own merit as a possible section, and all possible combinations are considered.

For example, the following sentence numbers in the above example could be valid "Patient Details" sections: sentences 1, 1-2, 2, 1-3, 2-3, 3, 1-4, 2-4, 3-4, 4, 1-5, 2-5, 3-5, 4-5, 5, 1-6, 2-6, 3-6, 4-6, 5-6, 6. For "Family History": sentences 4, 4-5, 5 For "Allergies": sentence 6.

In this case, there are several overlapping sections suggested for "Patient Details", and many of these also overlap with the suggested sections for "Family History". After applying the scoring mechanisms to the suggested sections, the mechanisms of the illustrative embodiments may find that the proposed section (4-5) for "Family History" scores much higher than any of the other overlapping sections proposed for "Patient Details". Similarly, sentence 6 could have a much higher score for "Allergies", than any of the other overlapping proposed sections. Therefore, although there were several proposed sections which overlapped, the highest scoring groups of non-overlapping sections can be returned as output, e.g., section 1-3 for Patient Details, section 4-5 for Family History, and section 6 for Allergies. Alternatively, all possible sets of sections, overlapping and otherwise, could be returned for further processing by the user.

In addition to the metadata describing the boundaries of sections in the document, an associated graph, displaying the semantic links between the proposed sections with detail from the underlying semantic network, may also be provided. Such a display of the semantic links may be used for debugging purposes by a user since the display indicates where there may be erroneous links between semantic concepts and, as a result, the rules/patterns may be adjusted appropriately to achieve a desired outcome.

Each proposed section of text may be scored for relatedness to the nearest preceding section heading in the document, or if no actual section heading exists in the document, the section of text may be scored with respect to a particular list of possible section heading types, or with respect to any other categorical grouping of subject matter, by virtue of the underlying semantic knowledge in the system. For example, concepts identified in the section text may be compared to concepts specified in the nearest preceding section heading to determine a degree of matching. The score for the relationship between the section text and the candidate section heading is weighted or modified based on the presence or lack of concepts in the candidate section heading which are known to be semantically associated and which are present in the section text.

Alternatively, if no actual section heading exists, concepts found within the section of text may be used to infer a section heading. For example, even without an explicit section heading in the document, a portion of text containing references to dogs, horses and cats may, by virtue of the semantic knowledge base, be determined to be indicative of the category "Animals", and the portion of text as a whole, including all the other concepts found, may be scored for relatedness to this inferred section heading. Thus, concepts within the text that are identified based on the existing knowledge resources, may be used to generate inferred headings and then the text of the content may be scored with regard to these inferred headings to determine a degree of relatedness of the portion of text to the inferred heading.

Similarly, weighting rules may be utilized to weight scores for relationships when expected concepts are missing from a section of text. That is, learned relationships between concepts, as may be specified in an ontology, semantic network, or the like, may be identified and may be used to identify concepts expected to be associated with concepts present in the candidate section heading/text, even though not explicitly included in the rules/patterns for the section heading or section text. If such concepts are present, then the score may be increased for the relationship between section heading and proposed section text, or more heavily weighted. If the concept is missing, the score may not be increased or may even be decreased, or less heavily weighted.

For example, consider the following two sentences appearing in a portion of a document associated with the heading "Medication":

The patient experienced pains in the head and paracetamol was administered. The ptnt suffered from headaches and was given acetaminophen.

By referencing a medical ontology, it can be discovered that the drug paracetamol and the drug acetaminophen are the same drug and that "headache" and "pain in the head" are synonyms referring to the same medical complaint or malady. A resource, such as Wordnet for example, may outline the relative equivalence of terms, such as the relationship between the terms "given" and "administered," as well as "suffered" and "experienced." Differing textual surface forms for equivalent entities, such as "patient" and "ptnt," are provided through named entity resources of ontologies, semantic networks, or other knowledge bases, as well as the use of fuzzy matching algorithms to recognize equivalent forms, and by extension, concepts. Thus, using these mechanisms, and applying appropriate section text rules/patterns, there are clear positive matches between these two sentences, despite the apparent differences in the text, such that these sentences may be considered part of the same section of text. Moreover, similar correlations may be made between the section text and the section heading "Medication" in that a pattern of malady and drug/treatment identifying a medication are shown.

Thus, a weighted score for each relationship between section text and nearest preceding section heading may be generated based on a degree of matching between the concepts of the proposed section text and the concepts present in the candidate section heading and/or the corresponding candidate section heading rule/pattern. These scores may then be used to select associations of proposed section text and corresponding candidate section headings to represent the document as a whole, such as in the metadata associated with the document. Such relationships between proposed section text and corresponding candidate section headings may be selected from amongst a plurality of overlapping proposed section texts and corresponding candidate section headings so as to minimize overlap in the resulting representation of section texts and section headings in the metadata associated with the document, e.g., the section heading and section text annotations in the metadata for the document.

For example, the scored sections of text, including overlapping sections of text, may be traversed to select the best scoring set of non-overlapping sections of text which provide a best coverage of the overall document. That is, criteria are evaluated with regard to maximizing the score of the relationships between section texts and corresponding actual or inferred section headings, minimizing an amount of overlap of section texts, and maximizing an amount of coverage of the entire textual content of the document. In one illustrative embodiment, complete coverage of the document is required, however in other illustrative embodiments, this requirement may be relaxed such that a maximum coverage or a threshold amount of coverage of the entire content of the document may be utilized.

The resulting set of section texts, corresponding actual or inferred section headings, and their relationships is output as the result of this process. These results may be used to generate metadata annotations stored in, or in association with, the document. These metadata annotations may then be used by document processing systems, such as a NLP system, QA system, or the like, to augment the processing of the document. For example, in a QA system, the section heading/section text relationship metadata annotations in the document or associated with the document may be used to modify the scores associated with candidate answers based on the sections in which the candidate answers are found in the document.

In the operation for selecting minimally or non-overlapping sections of text in the document for inclusion in the section text/section header association metadata annotations, the objective is to boost scores based on overall heading/section context and to resolve competing or ambiguously proposed sections of text, if they arise. In simpler cases, the best scoring set of non-overlapping sections is determined by taking a path through the document that has the largest sum of scores for the full non-overlapping coverage path through the document. While this is preferred, it is often required that the final selection of sections of text take into account the following when determining boost factors or increases in weightings for sections:

(1) the position of a proposed section of text relative to other proposed sections of text, e.g., where certain sections are usually followed by other sections—exploiting learned conditional probabilities of section sequences, e.g., an abstract is often followed by an introduction, etc.;

(2) the semantic distance between proposed sections, e.g., medication and treatments are closely related whereas treatments and symptoms are less closely related;

(3) a boost fact based on the probability of highest ranking adjacent sections with respect to the currently proposed section; and (4) if competing (similarly scored) proposed sections are sufficiently unrelated (e.g., a section is similarly scored for the headings of "symptoms" and "medication") then the system will modify the scores according to the relatedness of the corresponding candidate section headings and the subject matter, or concepts, of adjacent proposed sections.

During the process for selecting sections of text and corresponding associated section headings to represent the document, to help resolve conflicts and ambiguities, information from an external context may be used. For example, in cases where the section text/heading correlation mechanism 390 is used in conjunction with a QA system, such as in the depicted example of FIG. 3, the data from the question itself, and any candidate answer data, may be used to further disambiguate similar scoring conflicts. For example, in a system to analyze breast cancer patient cases, the complete patient history may be input as a document from the corpus and this patient history and other data may include references which talk about lung cancer. However, the selection process would be biased toward breast cancer due to contextual data supplied in the question or in the specified parameters.

Thus, the illustrative embodiments provide mechanisms for identifying section headers and section text based on structural and conceptual annotations, ontologies, semantic networks, and other knowledge bases. The illustrative embodiments further provide mechanisms for establishing relationships between identified or inferred section headers and corresponding section text. Moreover, the illustrative embodiments further provide mechanisms for selecting section headings and corresponding section text to represent a document, even in situations where section text overlaps, there are conflicts, or ambiguities in which proposed section text are actual sections within the document as intended by the original author. The illustrative embodiments generate annotation metadata for annotating the document to identify the selected section headings and corresponding sections that maximize section scores, minimize overlap of section text, and maximize document coverage.

FIG. 4 is an example diagram illustrating the manner by which a portion of text may be separated into sections based on structural annotations in accordance with one illustrative embodiment. As shown in FIG. 4, the portion of text includes section titles, such as a "PURPOSE:", "PATIENTS AND METHODS:", "RESULTS:", and the like. Such section titles may be identified based on structural rules/patterns, e.g., a term in all capital letters followed by a colon, or the like. Such rules/patterns may be defined for the identification of section headings, for example. Moreover, corresponding section text rules/patterns may be established with structural annotations specified indicating that section text appears after a colon and is terminated by a paragraph break, for example.

Using such rules/patterns, various section headings 410-450 and corresponding section text 460-495 as shown in FIG. 4 may be identified. The section text 460-495 may be associated with the nearest preceding section heading 410-450 based on structural annotations in the content, e.g., paragraph breaks or the like. Such associations based on structural annotations may be used as one factor along with concept annotations using the mechanisms of the illustrative embodiments, as previously described above and further illustrated with regard to FIGS. 5 and 6.

FIG. 5 is an example diagram illustrating the use of conceptual annotations to identify sections of a document in accordance with one illustrative embodiment. The example shown in FIG. 5 corresponds to the "Results" and "Conclusions" sections 490-495 shown in FIG. 4 but without section titles. FIG. 5 illustrates how the mechanisms of the illustrative embodiments may use concept annotation based rules/patterns to identify sections of text and relationships between sections of text.

In the example depicted in FIG. 5, a set of rules/patterns for patient records may be applied to the text to identify concepts, concept groups, related concepts/concept groups, structural features, actual/inferred headings, and the like, as previously described above. In this example, there are six basic concepts shown that may be identified through the application of rules/patterns: Patient Attributes, Patient Groups, Intensification, Conclusions, Patient Outcomes, and Drug Dosages. These concepts are represented by various dashed underlinings in the text of FIG. 5, thereby representing groups of semantic entities having the same concepts. The distribution of these different concept types within the text, and their associated characteristics as obtained through statistical analysis of the concepts within the text, such as Inverse Document Frequency (IDF) (a numerical statistic indicative of how important a word is to a document in a collection or corpus) and Concept Density, allow distinct sections to be identified, as previously described above.

Such characteristics and statistical analysis of the text may be utilized to learn various types of facts, especially when applied across a corpus, in order to predict and weight the most likely sections in unseen/future document text. For example, in the depicted example, there were many more Conclusion Concepts in the final section, than any other section of text. Thus, it can be learned that the final section of a document is likely to have more Conclusion Concepts than other sections of a document and hence, when analyzing future text, if a portion of the text has a relatively larger amount of Conclusion Concepts identified in it, then it can be considered to be the final section of the document.

Moreover, in the depicted example, through concept identification and statistical analysis the illustrative embodiments can determine that there are several Concept Types which are common to all three paragraphs of text, especially between the middle paragraph and the other paragraphs, thereby leading to an ambiguity in section membership of the middle paragraph. A given set of Concepts may suggest any number of different section headings. The middle paragraph here appears to share common Concepts between both the preceding and following paragraph.

To resolve this ambiguity, the illustrative embodiments may analyze the text data from several perspectives. For example, the illustrative embodiments may determine the Inverse Document Frequency (IDF) of the terms/concepts in the text and identify that only the third section contains a "Patient Attribute", marking it as a key Concept for that piece of text. Moreover, the illustrative embodiments may analyze the text data to identify common concepts in multiple paragraphs of the text. In this case, the concepts "Patient Group" and "Patient Outcome" occur in the first two paragraphs, but not in the third, thus indicating that the first and second paragraphs may be grouped into a cohesive section. Still further, the illustrative embodiments may analyze the concept density of the various concepts identified in the portion of text data. In this case, the illustrative embodiments may determine that there are more "Patient Outcomes" and "Patient Groups" in the first paragraph, and many more "Conclusions" in the final paragraph. These and other types of textual/concept analysis may be performed either individually or in combination, to extract concept/concept grouping information from the portion of text in order to identify related sections within the text and identify facts that may be used to generate rules/patterns for use with future portions of text in the same or other documents of the same or different corpus. By performing a statistical analysis of a corpus of similar documents, the illustrative embodiments can learn to associate these facts with particular actual or inferred section headings.

It should be noted that in FIG. 5, there are still distinct structural elements defining paragraphs of text in the depicted portion of text, which can be a useful clue in determining the limits of a given section, as previously described above, and may be used in conjunction with the identified concepts, concept groupings, and the like, to identify related sections of text. However, this is not always the case with real-world data, especially when documents can come from non human authored sources, such as scans of handwritten Doctors notes using optical character recognition. In such cases, it may not be easy for a human reader to determine the boundaries of sections in the hand-written document, let alone an automated process on the digitised form of the text. As demonstrated in FIG. 5, however, the illustrative embodiments can identify sections of text within a document regardless of whether there are structural annotations or section headings present in the document by identify concepts, patterns of concepts, groupings of concepts, etc., within the content of the document through the application of rules/patterns as well as performing statistical analysis on these concepts, patterns, groupings, etc.

As shown in FIG. 5, the illustrative embodiments may distinguish between paragraphs that are associated with particular section headings, even though at first glance, they do not appear to share similar semantic content, making this a non-trivial task. With statistical analysis the illustrative embodiments learn to group these paragraphs appropriately.

It should be appreciated that the operations of the illustrative embodiments may be employed at various granularities. For example, the above the above operations may also be performed on a sentence level rather than a paragraph level. Thus, the illustrative embodiments may group sentences together based on the presence or absence of concepts which indicate particular actual or inferred section headings. Even if there is no sentence heading commonly associated with the concepts discovered, in the underlying knowledge base at a given point in time, sentences which appear to contain similar sets of concepts can be grouped together as a contiguous section, with no labelled heading. Additionally, such unlabelled portions may be grouped with the preceding or following positively identified section, if the user of the system desires, leveraging the same comparative approaches to link with the more appropriate labeled section. Furthermore, in some illustrative embodiments, one may want to link text with headings not intended by the original author, and the ability to distinguish between parts of sentences at a word level using the mechanisms of the illustrative embodiments may be found useful and may thus, be implemented.

FIG. 6 is an example diagram illustrating the resulting sections of text identified using the mechanisms of one illustrative embodiment. In FIG. 6, similar dashed lines surrounding the sections, corresponding to the dashed lines indicating the various concepts shown in FIG. 5 are used to denote sections of text associated with the various inferred section headings corresponding to the concepts. Thus, for example, section 610 is associated with the concept/inferred section heading "Intensification", section 620 is associated with the concept/inferred section heading "Patient Outcomes", section 630 is associated with the concept/inferred section heading "Patient Groups", section 640 is associated with the concept/inferred section heading "Drug Dosage", and section 650 is associated with the concept/inferred section heading "Conclusions."

Figure 7:
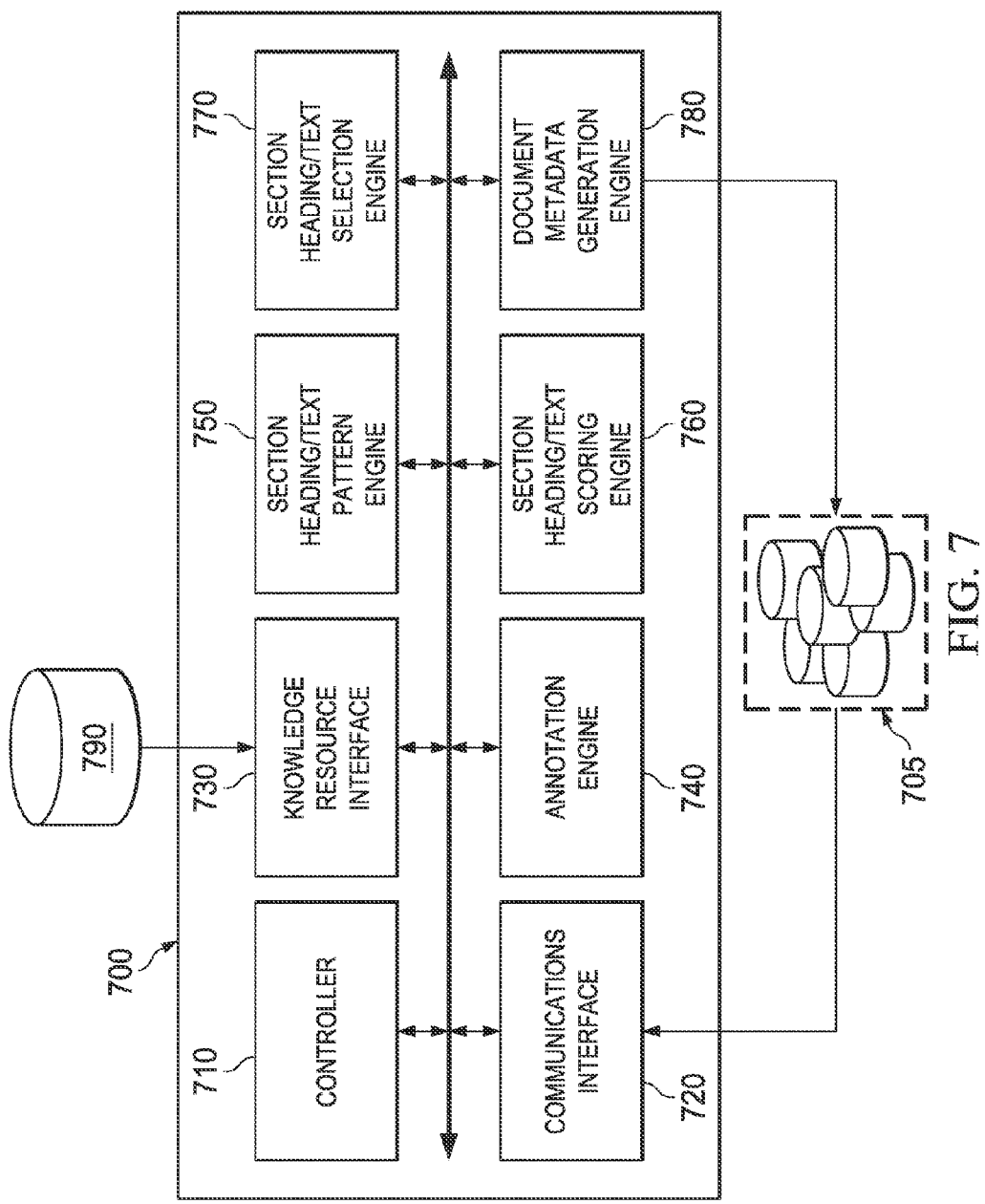
FIG. 7 is an example block diagram of a section text/heading correlation mechanism in accordance with one illustrative embodiment.

FIG. 7 is an example block diagram of a section text/heading correlation mechanism, such as section text/heading correlation mechanism 390 in FIG. 3, in accordance with one illustrative embodiment. The elements shown in FIG. 7 may be implemented in hardware, software, or any combination of hardware and software. In one illustrative embodiment, the elements in FIG. 7 may be implemented as software instructions executed on one or more processors of one or more data processing systems.

As shown in FIG. 7, the section text/heading correlation mechanism comprises a controller 710, a communication interface 720, an knowledge resource interface 730, an annotation engine 740, a section heading/text pattern engine 750, a section heading/text scoring engine 760, a section heading/text selection engine 770, and a document metadata generation engine 780. The controller 710 controls the overall operation of the section text/heading correlation mechanism 700 and orchestrates the operation of the other elements 720-780. The communication interface 720 provides a data communication pathway through which data may be sent and received. In particular, data corresponding to a document that is to be sectioned by the mechanisms of the illustrative embodiments may be received from a corpus of documents 705 and corresponding section metadata annotations generated by the section text/heading correlation mechanism 700, associated with the received document, may be stored in the corpus 705 in association with, or as part of, the document.

The controller 710 may perform an initial analysis of the received document, metadata associated with the document, or information received in a request or other communication forwarding the document, to identify a domain associated with the document. The domain may even be specified in association with the corpus 705 from which the document is received. In any case, the domain may be identified as a way of selecting which knowledge resources 790 to utilize when analyzing the document to perform sectioning in accordance with the illustrative embodiments. That is, there may be many different knowledge resources 790 developed for various specific and/or generic domains, e.g., a first "Medical" domain, a second "Accounting" domain, a third "Legal" domain, or the like. The knowledge resources 790 themselves may be ontologies of concepts, semantic networks, or the like. The knowledge resources 790 may be accessed via the knowledge resource interface 730.

The annotation engine 740 applies the knowledge resources to the content of the received document text to identify content, such as structural features, concept features, and the like, within the document and associate those with corresponding elements in the knowledge resources, e.g., concepts within an ontology, terms having semantic relationships, and the like. The annotation engine 740 may annotate the found features in the document with corresponding annotations of concept type, semantic types, structural elements, and the like. These annotations may be used by the section heading/text pattern engine 750 to apply section heading and section text rules/patterns, which may also be obtained from the knowledge resources 790, and which comprise rules/patterns referencing structural and/or conceptual annotations and sequences of such annotations, that define section headers and/or section texts.

The section heading/text pattern engine 750 applies these rules/patterns (where rules may enforce or otherwise comprise the patterns), to thereby identify candidate section headings in the document and proposed section texts in the document. The section heading/text scoring engine 760 may score relationships between proposed section texts and the nearest preceding candidate section heading. The section heading/text selection engine 770 may then select candidate section headings and their corresponding section texts so as to maximize the score of the relationships or links of selected candidate section headings and corresponding section texts while minimizing overlap and maximizing document content coverage of the selected section headings/texts. The resulting selected section headings and corresponding section texts are then used by the document metadata generation engine 780 to generate section annotation metadata that is stored in, or in association with, the document in the corpus 705.

Figure 8:
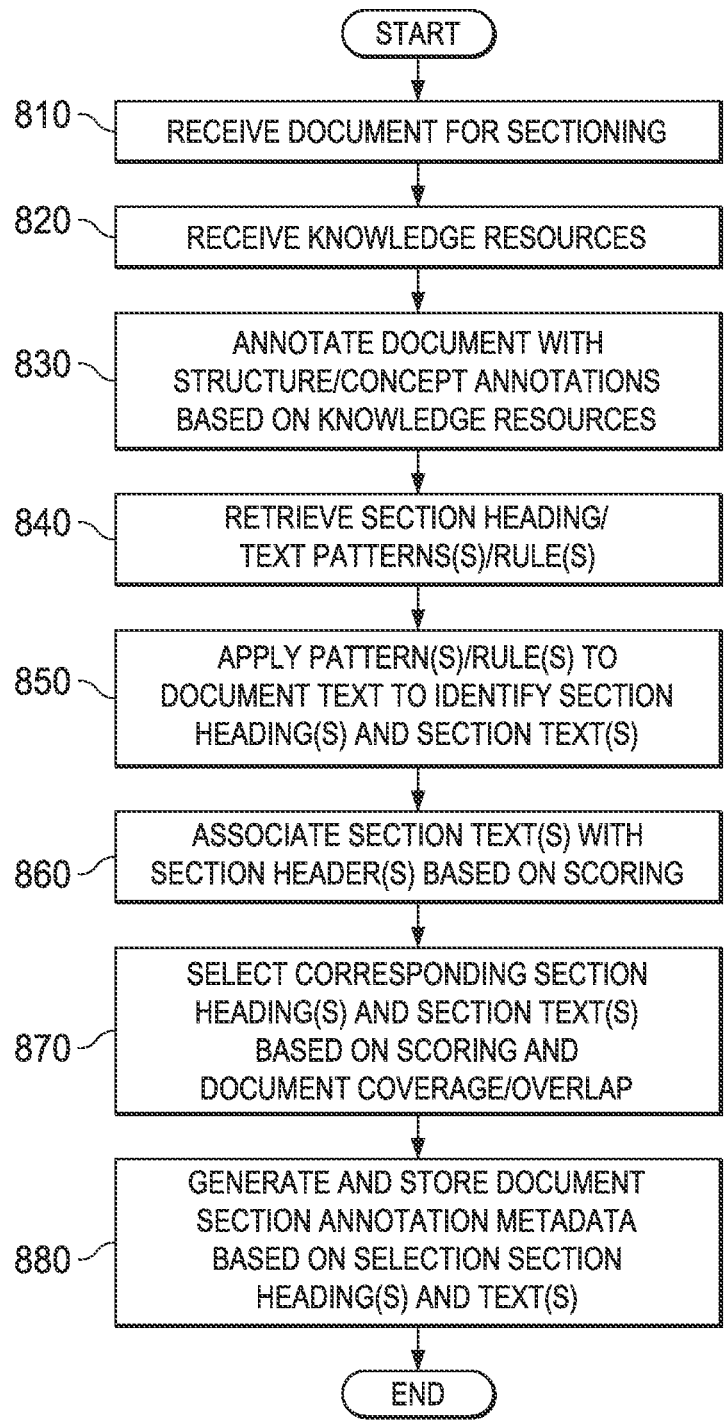
FIG. 8 is an example flowchart outlining an example operation for generating section heading/section text metadata for a document in accordance with one illustrative embodiment.

FIG. 8 is an example flowchart outlining an example operation for generating section heading/section text metadata for a document in accordance with one illustrative embodiment. The operation outlined in FIG. 8 may be implemented, for example, by the section text/heading correlation mechanism 390 and/or 700 in FIGS. 3 and 7, respectively. The operation illustrates a high level representation of the functions performed by the section text/heading correlation mechanism with each function comprising a number of sub-functions as previously described above. One of ordinary skill in the art will recognize that there may be many different ways in which to implement the mechanisms of the illustrative embodiments in view of the example provided in FIG. 8 without departing from the spirit and scope of the present invention.

As shown in FIG. 8, the operation starts by receiving a document that is to be sectioned in accordance with the operation of the illustrative embodiments (step 810). Knowledge resources are then retrieved to assist in the sectioning of the document (step 820). As noted above, these knowledge resources may comprise ontologies, semantic networks, or other types of knowledge bases that are generic or specific to a particular domain of the received document or the corpus from which the document was received.

The document is annotated with structure and concept annotations based on the information contained in the knowledge resources (step 830). Structural and/or conceptual rules/patterns are retrieved (step 840). These rules/patterns may also be generic in nature or specific to a domain of the received document or the corpus from which the document was received. These rules/patterns are applied to the document text to identify candidate section heading(s) and proposed section text(s) (step 850). The proposed section text(s) are associated with the nearest preceding section heading in the document and scored based on a weighted matching algorithm (step 860). Corresponding section heading(s) and section text(s) are selected based on the scoring and document coverage/overlap criteria (step 870). The selected section heading(s) and corresponding section text(s) are used to generate section annotation metadata that is stored in association with the document for later use by a document processing system (step 880). The operation then terminates.

It should be appreciated that the operation outlined in FIG. 8 may be performed iteratively such that a loop may be implemented to repeatedly perform the operations in FIG. 8 until a desired level of result is achieved, e.g., desired level of overlap/non-overlap of identified sections within the text is achieved. Moreover, while FIG. 8 references the use of structural annotations within the document, as discussed previously, the illustrative embodiments operate even in the absence of any such structural annotations and may operate completely based on identified concepts within the content of the text. That is, while the illustrative embodiments may leverage structural features in the text, these may not always be available. In such cases, where all sections are not obviously distinct in the document itself, the illustrative embodiments may rely completely on the semantic content, i.e. the annotated concepts. Thus, the output of the operation in FIG. 8 may include overlapping sets of suggested sections and the process to choose the best set that covers the document may require several iterations of scoring and re-ranking FIG. 8 shows a single iteration for simplicity of the drawing but is not intended to state or imply that only a single iteration must be used.

Furthermore, as noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for generating section metadata for an electronic document, the method comprising:
   receiving, by the data processing system, an electronic document for processing;
   analyzing, by the data processing system, the electronic document to identify concepts present within textual content of the electronic document;
   correlating, by the data processing system, concepts within the textual content with one another to identify concept groups within the textual content based on the application of one or more rules defining related concepts or concept patterns;
   determining, by the data processing system, at least one section of text within the textual content based on the correlation of concepts within the textual content;
   generating, by the data processing system, based on results of the determining, section metadata for the electronic document to thereby identify the at least one section in the electronic document; and
   storing, by the data processing system, the section metadata in association with the electronic document for use by a document processing system.

2. The method of claim 1, wherein determining at least one section of text within the textual content further comprises utilizing a knowledge base specifying a plurality of concepts or concept groups and determining a measure of affinity between each concept or concept group in the knowledge base and portions of the textual content.

3. The method of claim 1, wherein determining at least one section of text within the textual content further comprises determining a measure of affinity between a concept in a candidate section of text in the textual content to a section header in the textual content.

4. The method of claim 1, wherein determining at least one section of text within the textual content further comprises:
   identifying a candidate section heading and a proposed section of text within the electronic document;
   determining whether the proposed section of text has a threshold measure of affinity to the candidate section heading based on one or more concept elements within the proposed section of text; and
   selecting the proposed section of text to be an actual section of text associated with the candidate section heading in response to the proposed section of text having at least the threshold measure of affinity to the candidate section heading.

5. The method of claim 4, wherein the candidate section heading is an inferred section heading inferred from a concept or concept group associated with the proposed section of text.

6. The method of claim 1, wherein determining at least one section of text within the textual content based on the correlation of concepts within the textual content comprises performing a statistical analysis of the concepts within the textual content, wherein the statistical analysis comprises at least one of concept density analysis, inverse document frequency analysis, or concept commonality analysis amongst a plurality of proposed sections of text within the textual content.

7. The method of claim 1, wherein the textual content does not have associated structural annotations, and wherein determining at least one section of text within the textual content based on the correlation of concepts within the textual content is performed without regard to structural annotations being associated with the textual content.

8. The method of claim 1, wherein determining at least one section of text within the textual content based on the correlation of concepts within the textual content further comprises determining the at least one section of text within the textual content also based on structural annotations associated with the textual content.

9. The method of claim 1, wherein the document processing system is a natural language processing system, and wherein the method further comprises performing natural language processing on the electronic document based on the section metadata associated with the electronic document.

10. The method of claim 1, wherein the document processing system is a question and answer system and wherein the electronic document is part of a corpus of documents ingested by the question and answer system, and wherein the method further comprises performing a question answering operation on an input question using the section metadata associated with the electronic document, wherein the section metadata is used by the question and answer system to modify a score associated with a candidate answer obtained from the electronic document.

11. A computer program product comprising a non-transitory computer readable medium having a computer readable program stored therein, wherein the computer readable program, when executed on a data processing system, causes the data processing system to:
   receive, an electronic document for processing;
   analyze the electronic document to identify concepts present within textual content of the electronic document;
   correlate concepts within the textual content with one another to identify concept groups within the textual content based on the application of one or more rules defining related concepts or concept patterns;
   determine at least one section of text within the textual content based on the correlation of concepts within the textual content;
   generate, based on results of the determining, section metadata for the electronic document to thereby identify the at least one section in the electronic document; and
   store the section metadata in association with the electronic document for use by a document processing system.

12. The computer program product of claim 11, wherein the computer readable program causes the data processing system to determine at least one section of text within the textual content further at least by utilizing a knowledge base specifying a plurality of concepts or concept groups and determining a measure of affinity between each concept or concept group in the knowledge base and portions of the textual content.

13. The computer program product of claim 11, wherein the computer readable program causes the data processing system to determine at least one section of text within the textual content further at least by determining a measure of affinity between a concept in a candidate section of text in the textual content to a section header in the textual content.

14. The computer program product of claim 11, wherein the computer readable program causes the data processing system to determine at least one section of text within the textual content further at least by:
   identifying a candidate section heading and a proposed section of text within the electronic document;
   determining whether the proposed section of text has a threshold measure of affinity to the candidate section heading based on one or more concept elements within the proposed section of text; and
   selecting the proposed section of text to be an actual section of text associated with the candidate section heading in response to the proposed section of text having at least the threshold measure of affinity to the candidate section heading.

15. The computer program product of claim 14, wherein the candidate section heading is an inferred section heading inferred from a concept or concept group associated with the proposed section of text.

16. The computer program product of claim 11, wherein the computer readable program causes the data processing system to determine at least one section of text within the textual content based on the correlation of concepts within the textual content at least by performing a statistical analysis of the concepts within the textual content, wherein the statistical analysis comprises at least one of concept density analysis, inverse document frequency analysis, or concept commonality analysis amongst a plurality of proposed sections of text within the textual content.

17. The computer program product of claim 11, wherein the textual content does not have associated structural annotations, and wherein determining at least one section of text within the textual content based on the correlation of concepts within the textual content is performed without regard to structural annotations being associated with the textual content.

18. The computer program product of claim 11, wherein the computer readable program causes the data processing system to determine at least one section of text within the textual content based on the correlation of concepts within the textual content further at least by determining the at least one section of text within the textual content also based on structural annotations associated with the textual content.

19. The computer program product of claim 11, wherein the document processing system is a question and answer system and wherein the electronic document is part of a corpus of documents ingested by the question and answer system, and wherein the computer readable program further causes the data processing system to perform a question answering operation on an input question using the section metadata associated with the electronic document, wherein the section metadata is used by the question and answer system to modify a score associated with a candidate answer obtained from the electronic document.

20. An apparatus comprising:
a processor; and
a memory coupled to the processor, wherein the memory comprises instructions which, when executed by the processor, cause the processor to:

receive, an electronic document for processing;
analyze the electronic document to identify concepts present within textual content of the electronic document;
correlate concepts within the textual content with one another to identify concept groups within the textual content based on the application of one or more rules defining related concepts or concept patterns;
determine at least one section of text within the textual content based on the correlation of concepts within the textual content;
generate, based on results of the determining, section metadata for the electronic document to thereby identify the at least one section in the electronic document; and
store the section metadata in association with the electronic document for use by a document processing system.

* * * * *